US006880017B1

(12) United States Patent
Marce et al.

(10) Patent No.: US 6,880,017 B1
(45) Date of Patent: Apr. 12, 2005

(54) SYSTEM AND METHOD FOR PROVIDING AN ADAPTIVE STREAMING FLOW CONTROL MECHANISM BETWEEN THE TCP AND IP LAYERS OF THE TCP/IP SUITE OF PROTOCOLS

(75) Inventors: Jean-Pierre Marce, St. Jeannet (FR); Pascal Thubert, Vence (FR); Denis Esteve, Vence (FR); Lionel Denecheau, La Colle s/Loupe (FR)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 09/629,663

(22) Filed: Aug. 1, 2000

(30) Foreign Application Priority Data

Mar. 20, 2000 (EP) ............................................ 00480028

(51) Int. Cl.[7] ............................. G06F 15/18; G06F 9/16
(52) U.S. Cl. ....................... 709/232; 709/233; 709/234; 719/321
(58) Field of Search ................................ 370/400, 338, 370/229; 709/249, 232; 345/765; 719/321

(56) References Cited

U.S. PATENT DOCUMENTS

| | | | | |
|---|---|---|---|---|
| 6,172,990 | B1 | * | 1/2001 | Deb et al. .................... 370/474 |
| 6,526,022 | B1 | * | 2/2003 | Chiu et al. ................... 370/229 |
| 6,594,268 | B1 | * | 7/2003 | Aukia et al. ................. 370/400 |
| 2002/0099854 | A1 | * | 7/2002 | Jorgensen .................... 709/249 |
| 2003/0058277 | A1 | * | 3/2003 | Bowman-Amuah ......... 345/765 |
| 2003/0067903 | A1 | * | 4/2003 | Jorgensen ................... 370/338 |

OTHER PUBLICATIONS

"On the Modelling and Performance Analysis of End–to–End Connections in Interconnected Networks", Andrew John Vernon 1998.*

"RAP: and end to end rate based congestion control mechanism for realtime in the Internet", Reza Rejaie et al. IEEE INFOCOM '99.*

"On the Modelling and Performance Analysis of End to End Connections in Interconnected Networks", Andrew John Vernon 1988.*

"Vendors on flow control" □□Network World Sep. 13, 1999.*

"Which bandwidth management approach is best?" □□Network World Jul. 27, 1998 □□Bob Quillin.*

"Efficient Congestion Avoidance Mechanism" □□IEEE Computer Society Los Alamitos, CA, USA □□Dracinschi, A.; Fdida, S.*

"Traffic shapers: IP in cruise control"□□Data communications. New York: Sep. 21, 1998. vol. 27, Iss. 13; p. 66, 8 pgs □□Marguerite Reardon.*

* cited by examiner

*Primary Examiner*—Dung C. Dinh
*Assistant Examiner*—Chad Zhong
(74) *Attorney, Agent, or Firm*—Duke W. Yee; Jerry W. Herndon; Gerald H. Glanzman

(57) ABSTRACT

In a data communication network operated under the TCP/IP suite of protocols the invention adds an adaptive streaming (AS) layer, inserted between the IP and the TCP protocol layers, in which the received data packets of each open TCP connection are temporarily queued and from where they are first reordered then, delivered to the TCP layer at a pace matching the optimal receiving rate of TCP connections. Thus, the invention adds a rate-based transmission mechanism to the TCP layer for the received data packets so as to better adapt to higher-speed communication lines and to reduce drastically the burstiness of the TCP flow control.

12 Claims, 4 Drawing Sheets

SYSTEM AND METHOD FOR PROVIDING AN ADAPTIVE STREAMING FLOW CONTROL MECHANISM BETWEEN THE TCP AND IP LAYERS OF THE TCP/IP SUITE OF PROTOCOLS

BACKGROUND OF THE INVENTION

The present invention relates generally to the Internet suite of protocols (TCP/IP) and, more particularly, provides for a mechanism to carry out an adaptive flow control mechanism between the Internet Protocol (IP) and the Transmission Control Protocol (TCP) of the TCP/IP suite of protocols.

The TCP/IP protocol suite, commonly referred to as TCP/IP, is named for two of its most important protocols: Transmission Control Protocol (TCP) and Internet Protocol (IP).

The first goal of TCP/IP is to enable the interconnection of networks that provide universal communication services. Although each physical network may have its own technology-dependent communication interface, in the form of a programming interface that provides basic communication functions, communication services are provided by software that runs between the physical network and the user applications and that provides a common interface for these applications, independent of the underlying physical network so that the architecture of the physical network is hidden from the user.

The second aim is to interconnect different physical networks to form what appears to the user to be one large network. Such a set of interconnected networks is called an internetwork or an internet and often just the Internet when referring to the global world wide IP network.

To be able to interconnect two networks, one needs a computer-like device that is attached to both networks and that can forward packets from one network to the other; such a machine is called a router, or an IP router, since routing function is part of the IP layer of the TCP/IP protocol suite. The basic properties of a router are such that from the network standpoint, a router is a normal host while from the user standpoint, routers are invisible. The user sees only one large internetwork. Thus, to be able to identify a host on the internetwork, each host is assigned an address i.e., the IP address and, when a host has multiple network adapters or interfaces, each interface has a unique IP address. The IP address consists of two parts: IP address=<network number><host number>. The network number part of the IP address is assigned by a central authority and is unique throughout the Internet. The authority for assigning the host number part of the IP address resides with the organization that controls the network identified by the network number.

Like most networking software, TCP/IP is modeled in layers thus, forming a protocol stack. This is convenient for positioning the TCP/IP protocol suite against other protocols or to compare it to the Open System Interconnection (OSI) model of the ITU-T (International Telecommunications Union—Telecommunication Standardization Sector) even though functional comparisons cannot easily be extracted from this, as there are basic differences in the layered models used by the different protocol suites. Nevertheless, the Internet protocols are modeled in four layers as shown in FIG. 1. The top one is the application layer provided by the program that uses TCP/IP for communication. An application is a user process cooperating with another process on the same or a different host. The interface between the application layer and the transport layer, situated just below it in the protocol stack, is defined by port numbers and sockets. Transport Layer is aimed at providing the end-to-end data transfer. Multiple applications can be supported simultaneously. The transport layer is responsible for providing a reliable exchange of information. The most widely used transport layer protocol is TCP which is further discussed hereafter while another less sophisticated transport layer protocol sometimes used is UDP (User Datagram Protocol) which provides a connectionless service contrary to TCP, which provides a connection-oriented service (i.e., before transmitting data, participants must establish a connection). Therefore, applications using UDP as the transport protocol have to provide their own end-to-end flow control and, usually, UDP is used by applications that need a fast transport mechanism. Underneath is the internetwork layer, also called the internet layer or the network layer which provides the "virtual network" image of an internet (that is, this layer shields the higher levels from the physical network architecture below it). Internet Protocol (IP) is the most important protocol in this layer. It is a connectionless protocol that does not assume reliability from the lower layers. IP does not provide reliability, flow control or error recovery. These functions are e.g., provided by TCP. Part of communicating messages between computers is a routing function that ensures that messages will be correctly delivered to their destination. IP provides this routing function. A message unit in an IP network is called an IP datagram. This is the basic unit of information transmitted across TCP/IP networks. Other internetwork layer protocols are ICMP (Internet Control Message Protocol), IGMP (Internet Group Management Protocol), ARP (Address Resolution Protocol) and RARP (Reverse ARP). Then, the bottom layer is the network interface layer, also called the link layer or the data-link layer, aimed at interfacing the actual network hardware. This interface may or may not provide reliable delivery, and may be packet or stream oriented. In fact, TCP/IP does not specify any protocol here, but can use almost any network interface available, which illustrates the flexibility of the IP layer. An example is IEEE 802.x or Ethernet LAN (Local Area Network). It is worth noting that there is not, per se, any network layer protocol described or standardized rather, standardized ways of accessing network hardware protocols, from the internetwork layer, are specified. The actual interactions between the layers are shown by the arrows in FIG. 1.

Thus, TCP is the standard transport protocol of IP networks. It is described by RFC (Request For Comments) number 793 of the IETF (Internet Engineering Task Force). Although its status is only recommended, in practice, every TCP/IP implementation, that is not used exclusively for routing, includes TCP. TCP is a connection-oriented protocol used by most of the user application protocols, such as Telnet (the terminal emulation protocol used for remote terminal connection, enabling users to log in to a remote system and use resources as if they were connected to a local system) and FTP (File Transfer Protocol). Two processes, running at the applications layer, communicate with each other over a TCP connection. Thus, the primary purpose of TCP is to provide reliable logical circuit or connection service between pairs of processes. It does not assume reliability from the lower-level protocols (such as IP), so TCP guarantees this itself. TCP can be characterized by the following facilities it provides for the applications using it.

First, from the application's viewpoint, TCP transfers a contiguous stream of bytes through the network. The application does not have to bother with chopping the data into basic blocks or datagrams. TCP does this by grouping the bytes in TCP segments, which are passed to IP for transmission to the destination. Also, TCP itself decides how to segment the data and it can forward the data at its own convenience.

Moreover, TCP assigns a sequence number to each byte transmitted and expects a positive acknowledgment (ACK) from the receiving TCP. If the ACK is not received within a timeout interval, the data is retransmitted. Since the data is transmitted in blocks (TCP segments) only the sequence number of the first data byte in the segment is sent to the destination host. The receiving TCP uses the sequence numbers to rearrange the segments when they arrive out of order, and to eliminate duplicate segments.

Also, receiving TCP, when sending an ACK back to the sender, indicates to the sender the number of bytes it can receive beyond the last received TCP segment, without causing overrun and overflow in its internal buffers thus, performing flow control. This information is sent in the ACK in the form of the highest sequence number it can receive without problems. This mechanism is also referred to as a window-mechanism or sliding window. TCP divides this contiguous byte stream into TCP segments to transmit them. The sliding window principle is used at the byte level; that is, the segments sent and ACKs received carry byte-sequence numbers and the window size is expressed as a number of bytes, rather than a number of packets. The window size is determined by the receiver when the connection is established, and is variable during the data transfer. Each ACK message includes the window size that the receiver is ready to deal with at that particular time. The reliability and flow control mechanisms briefly described above require that TCP initializes and maintains certain status information for each data stream forming a logical connection.

All of this and much more are described at length in numerous publications on TCP/IP and IP networks. One well-known reference on the subject being 'Internetworking with TCP/IP' by Douglas E. Corner, 2nd Edition, Prentice Hall, 1991.

Although TCP/IP protocols have proven to be very effective to implement large and very large networks, as illustrated by the explosive growth of the Internet over the recent years, limitations of TCP have also been reported in the same time frame. As an example, as early as 1990, RFC1185 entitled 'TCP Extension for High Paths' was contemplating some extensions of the original protocol to better adapt to the higher transmission speed of telecommunication lines. Later, in 1992, this RFC was superseded by RFC1323 'TCP Extensions for High Performance' proposing a set of extensions to improve performance over large BDP (Bandwidth Delay Product) paths and to provide reliable operation over very high-speed paths. Still, numerous papers on the subject were published afterwards reporting performance problems observed in the Internet along with solutions to improve the overall flow control mechanism, based on the sliding window concept of TCP, in an attempt to better adapt to high speed paths with long latencies. Indeed, modern implementations of TCP contain four intertwined algorithms that were documented in RFC2001, published in January 1997. Namely: slow start, congestion avoidance, fast retransmit, and fast recovery. Nevertheless, those improvements have not drastically changed the original TCP concept of handling flow control which has shown its limitations to cope with today's very-high-speed transmission lines. Moreover, TCP/IP networks that were originally all-data networks are nowadays becoming all-purpose networks aimed at transporting multi-media information including voice in an attempt to become the ubiquitous network of the future. In contrast to pure data, this latter type of transported information does not fit well with the TCP concept of window, known to be bursty i.e., which does not really care of delivering the pieces of information at regular intervals as the transportation of voice would demand so as to reach the expected level of quality necessary to compete seriously with standard telephone networks.

OBJECTS OF THE INVENTION

Thus, it is a broad object of the invention to add a rate-based transmission mechanism for handling congestion and flow control in TCP/IP networks on top of the sliding window concept so as to better adapt to higher-speed communication lines.

It is another object of the invention to reduce drastically the burstiness of the flow control TCP mechanism.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system for receiving data packets in a data communication network operated under the TCP/IP suite of protocols are disclosed. The data packets of each open TCP connection are temporarily queued in an adaptive streaming (AS) layer inserted between the IP and the TCP protocol layers. For each open TCP connection, assumed to have an optimal receiving rate, data packets received from the IP protocol layer are temporarily stored in a queue dedicated to that open TCP connection in the AS layer where they are first reordered. Then, they are delivered to the TCP protocol layer at a pace matching the optimal receiving rate of the TCP connection.

Thus, the invention adds a rate-based transmission mechanism to the TCP layer for the received data packets so as to better adapt to higher-speed communication lines and to reduce drastically the burstiness of the TCP flow control.

DETAILED DESCRIPTION OF THE PREFERRED EMBODIMENT

Figure 1:
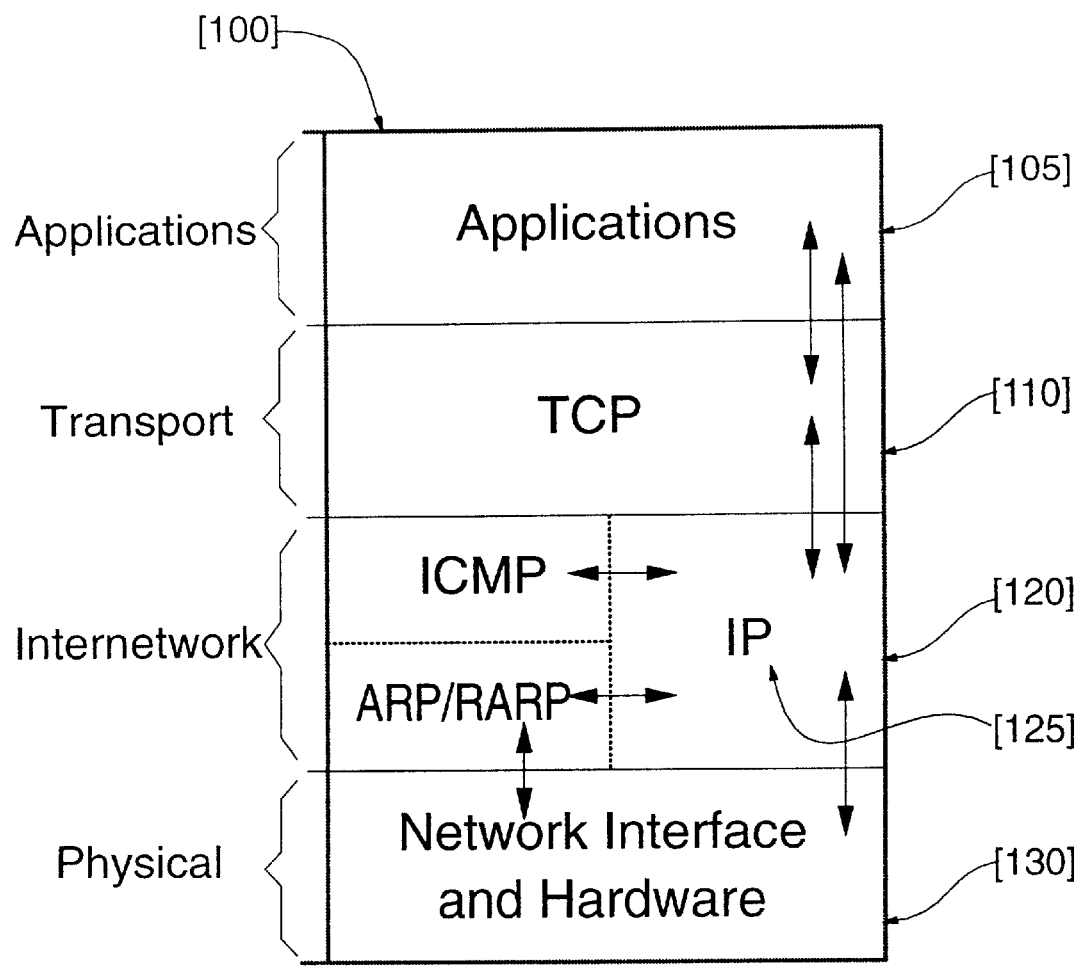
FIG. 1 shows the four layers of the TCP/IP suite of protocols.

FIG. 1 illustrates the four layers of the Internet suite of protocols [100]. The upper layer in this model is the application layer [105] from where a user process, that uses TCP/IP for communication, is run so as to cooperate with another process on the same or a different host, An example of such an application is SMTP (Simple Mail Transfer Protocol). Below, the transport layer [110] provides the end-to-end data transfer in order to ensure reliable exchange of information between user processes. The main layer transport protocol is TCP which provides a connection-oriented service. Then, the internetwork layer protocols

[120] mainly comprised of the IP protocol [125] is aimed at providing a "virtual network" image of the physical network below it. It is a connectionless protocol whose main task is to route message units, called IP datagram, letting TCP to care about reliability, flow control or error recovery. Finally, the lower layer [130] is in charge of interfacing the actual network hardware.

Figure 2:
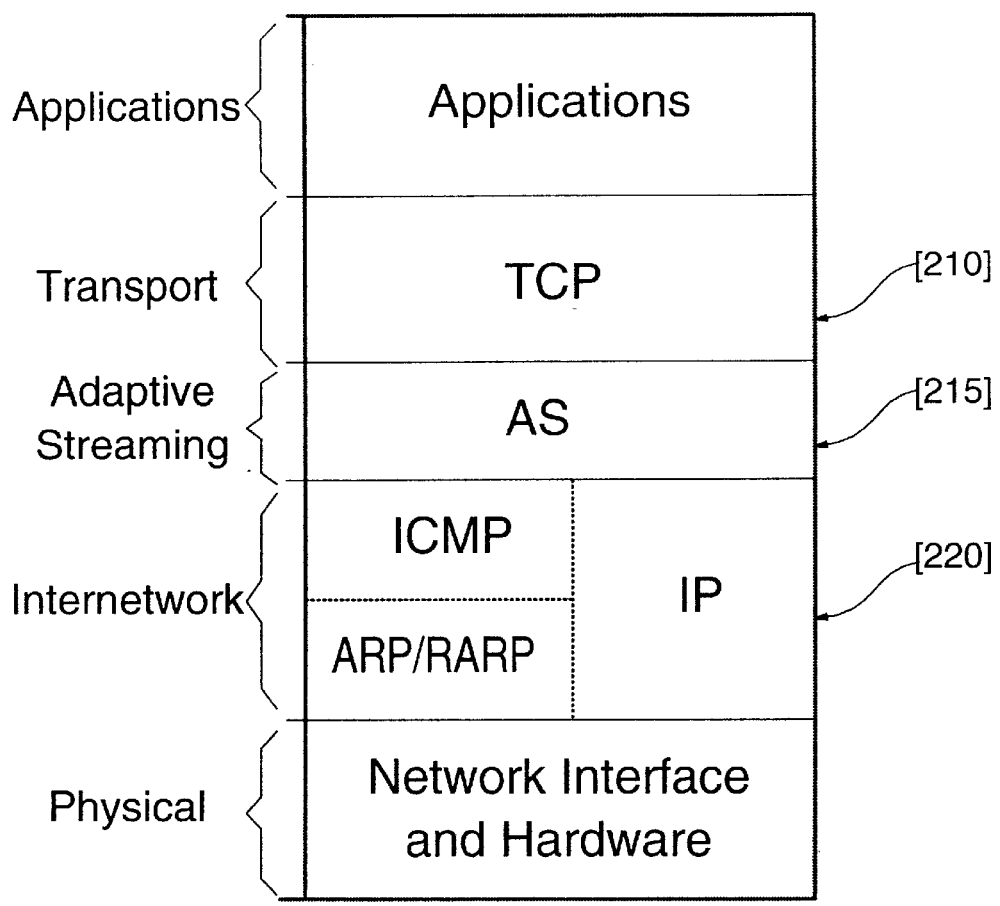
FIG. 2 introduces the AS (Adaptive Streaming) layer between the TCP layer and the IP layer.

FIG. 2 shows where the invention is positioned in the standard 4-layer TCP/IP model. An intermediate layer, called AS (adaptive streaming) [215] is created between the transport layer [210] and the internetwork (IP) layer [220]. This extra layer is aimed at solving the problems of the previous art taking care, for the upper transport protocol (TCP), of the most disturbing problems it encounters i.e., burtiness and disordering of the received IP datagrams. This, in order that TCP can still be used efficiently with high speed and high latency networks on which extra constraints have been added recently. Not only IP networks have, as ever, to transport pure data files but they are nowadays more and more sollicited to transport all sorts of multi-media information especially, digitized voice for which quality of service is a must. Therefore, AS layer contributes to achieve the ultimate goal of IP networks which is to become the ubiquitous network of the future aimed at merging over a single world-wide network all sorts of communications (telephone, data, video, etc . . . )

Figure 3:
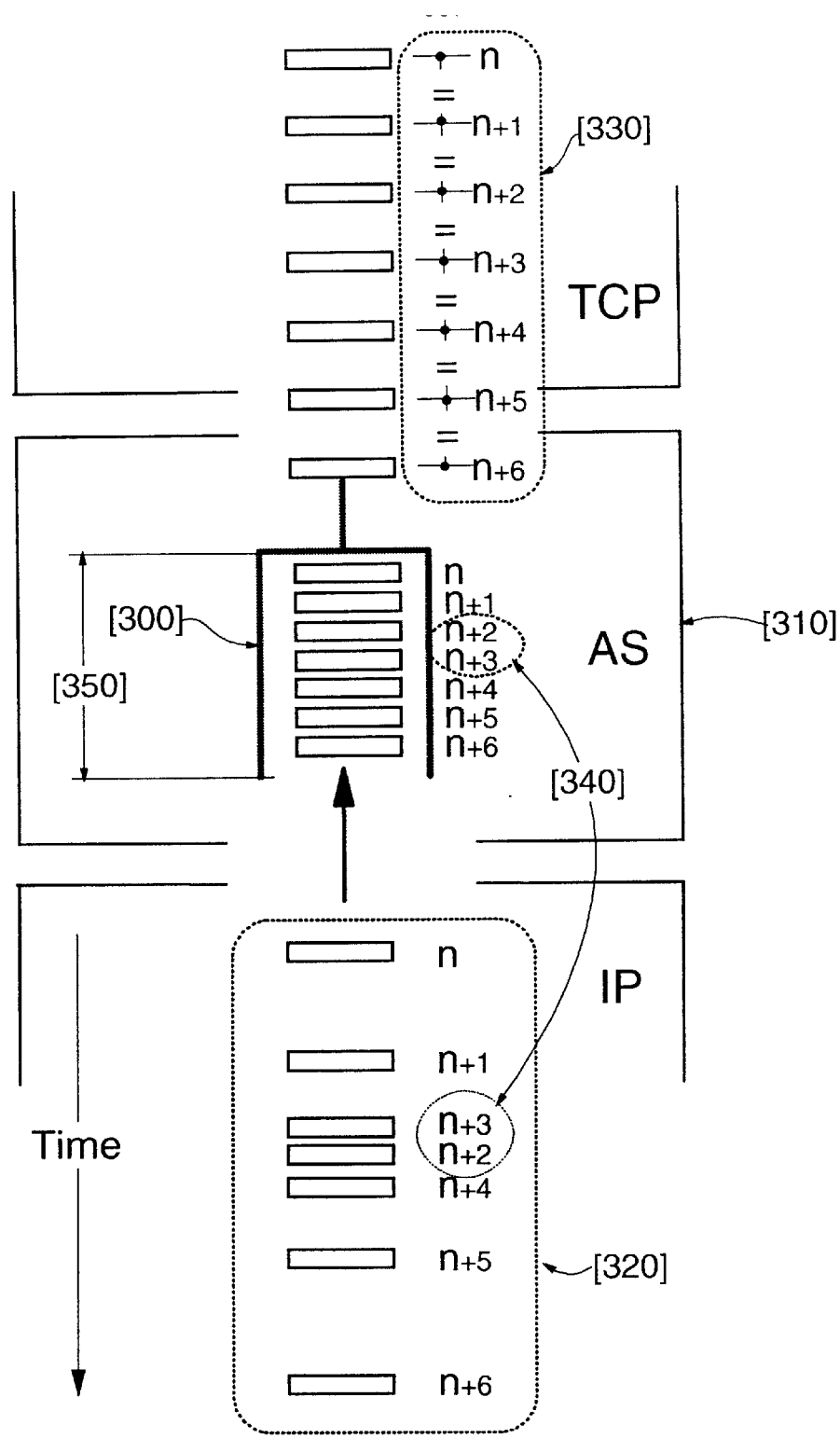
FIG. 3 describes the functions of the AS layer.

FIG. 3 describes the main idea of the invention which introduces a queuing mechanism [300] within the AS layer [310] so as datagrams [320] received from a remote application through the IP layer below are queued, on a per TCP connection basis, and delivered at a regular rate [330] so as to absorb the burstiness of the incoming data packets [320]. Rate at which packets are delivered to the TCP layer, if not a predefined known parameter for a TCP connection, can thus be lowered until the queue does not overfill or permanently exceed a predefined level so as the delivering rate [330] better approaches the actual observed average rate of the TCP connection.

Moreover, the AS layer detects out-of-sequence datagrams and reorders them [340] within its queue, saving the costly retransmissions that may uselessly take place otherwise. Although TCP was devised to be able to handle this situation it is, in practice, a slow and disturbing operation that must be avoided as much as possible in order to be able to reach the performances required by high speed and hich latency modern IP networks. In practice, the sliding window of TCP is made as large as possible iso as the emitting side is permitted to sent a large amount of data without having to receive any acknowledgment from its receiving counterpart. This is necessary in high speed and/or high latency networks (i.e., in networks where bandwidth*delay product is 106 or above) in an attempt to better takes advantage of the available bandwidth irrespective of the transmission delays as discussed e.g., in RFC1106. Hence, this assumes that the receiving queue has a size [350] compatible with the defined TCP window and can temporarily store all transmitted data while delivering them in an orderly manner to above the TCP layer.

It is worth noting here that the above is more easily achievable if the transmitting side is also pacing the emission of datagrams so that only the jitter introduced by the network itself is to be compensated by the receiving side. Indeed, a technique, applicable to the source of data, known under the acronym of RBP (Rate-based pacing), is discussed in RFC2760 of the IETF. This technique, or any equivalent one, in which the emission of data is throttled, to better adapt to the actual connection rate, should advantageously be utilized in combination with the present invention so as to withdraw the best possible performances of a network while reaching the level of QoS (Quality of Service) necessary to transport voice and other multi-media sources of data over IP networks.

Figure 4:
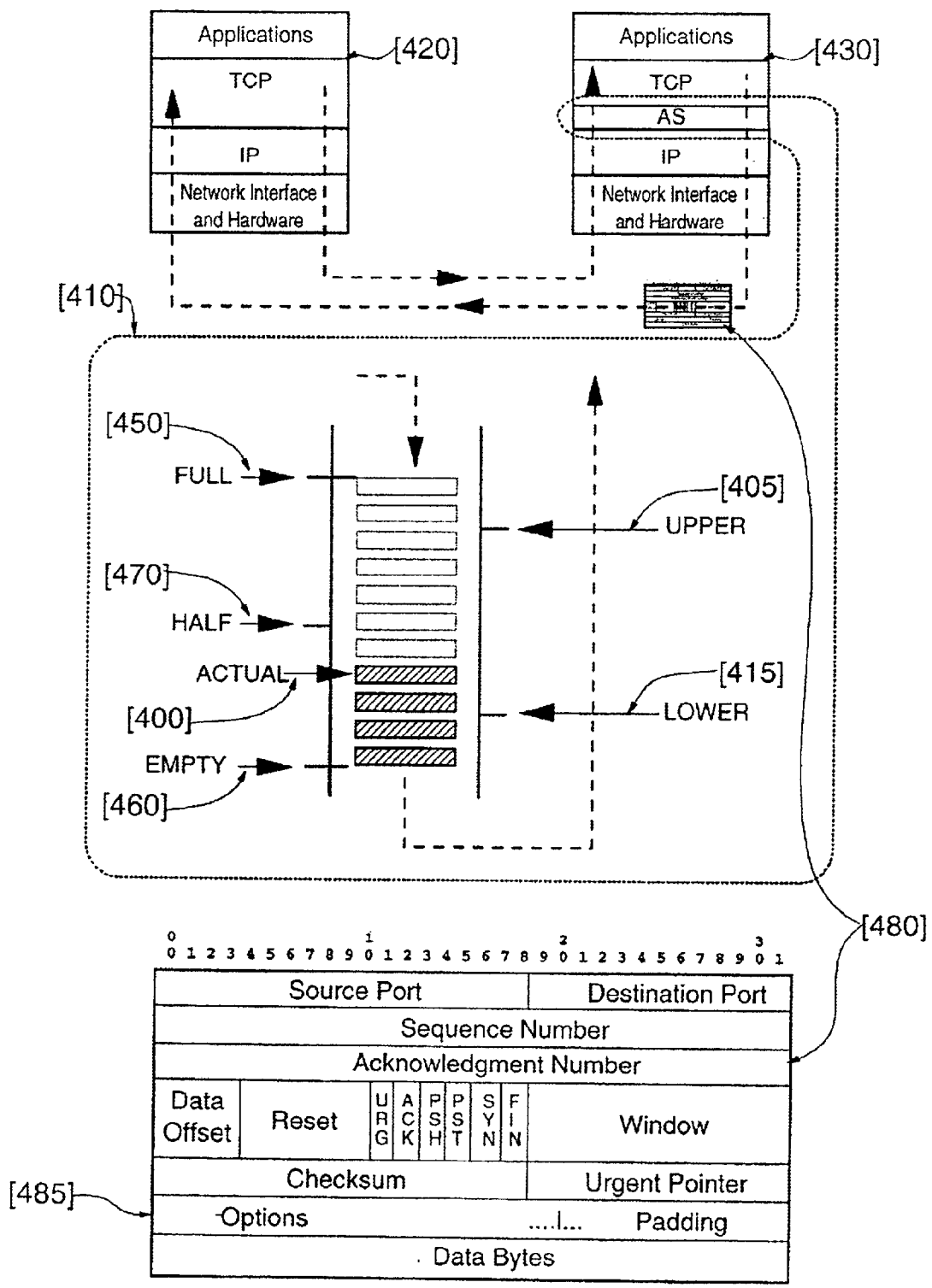
FIG. 4 depicts how source rate adaption is carried out from the observation of AS queue filling.

FIG. 4 further elaborates on the dynamic adaptation that can optionally be carried out, with the system of the present invention, on top of the receive pacing and reordering described in FIG. 3, in order to obtain even better results. By watching the filling of the queue [400] in the AS layer [410] it becomes possible to piggy back the information, up to the source [420], so as this latter has the opportunity of reacting accordingly. If either the application layer or the TCP layer of the receive end [430] cannot absorb the flow of data transmitted from the AS layer the queue is going to grow up to its maximum size [450]. On the contrary, if application layer and TCP are capable of processing more data than the amount delivered by the AS layer [410] for a long time then, the queue will eventually become empty [460]. Hence, the ideal steady state is reached when queue filling stays, on the average, half-way [470] from being depleted or full so that it can equally adapt well to temporary bursts or lack of data. When reached, this state reflects the fact that the sending of data by the source [420] fits well, on the average, the capacity of the receive function [430] to process them, allowing AS queuing to play completely its role of absorbing the received data jitter. Therefore, by intercepting in the AS layer the connection acknowledgments normally generated by TCP [480], the information about the actual filling of the AS queue is piggy back to the source so as this latter is informed if the emission rate must be ajusted i.e., increased or decreased, in an attempt to converge towards the here above ideal steady state. Among the numerous possible methods, known from the art, to carry this out, a preferred simple implementation consists in defining an upper threshold [405] and a lower threshold [415] of the AS queue filling. Then, when crossed, these thresholds trigger the sending towards the source of the corresponding information an indication requesting that it slow down the sending of data while upper threshold [405] is exceeded or, increase its rate if filling of the AS queue stays below the lower threshold [415]. In practice, this is accomplished by using the options field [485] of the TCP segment, as defined in the TCP/IP suite of protocol, format of which is shown [480].

Also, it is worth mentioning here that the here above mechanism however, excluding the sending of indications, back to the source, and requesting to increase or decrease its data rate, can also be used locally (in the receiver) to adjust the data delivery rate from the AS layer to the TCP layer as discussed and shown [330] here above in FIG. 3. Especially, this applies when the TCP and the application layers have performance in excess of what the source is capable of sending anyway, in which case data delivery to the TCP layer needs only to be adjusted to the actual average sending rate of, the source so as to fully take advantage of the queueing mechanism which therefore, can absorb the burstiness of the incoming data packets.

What is claimed is:

1. A method for receiving data packets, in a data communication network operated under a TCP/IP suite of protocols, comprising a TCP protocol layer and an IP protocol layer, wherein said each open TCP connection has an optimal receiving rate, said method comprising, for said each open TCP connection, the steps of:

receiving said data packets from said IP protocol layer;

temporarily storing said data packets in a queue dedicated to each said open TCP connection, wherein the queue is in an adaptive streaming (AS) protocol layer inserted between the IP protocol layer and the TCP protocol layers of said TCP/IP suite of protocols;

reordering said data packets in the queue; and delivering from said AS protocol layer, to said TCP protocol layer, said data packets at said optimal receiving rate of said TCP connection.

2. The method according to claim 1 wherein said optimal receiving rate is a predefined known rate for said open TCP connection.

3. The method according to claim 1 wherein said optimal receiving rate is deduced from an observation of filling of said queue, further including the steps of:

increasing the delivery rate from said AS protocol layer, to said TCP protocol layer, when the filling of said queue goes below an upper threshold; and decreasing said delivery rate from said AS protocol layer, to said TCP protocol layer, when the filling of said queue goes above a lower threshold.

4. The method according to claim 1 wherein data packets are sent by a source, said optimal receiving rate being adjusted by the source from the observation of the filling of said queue in said AS layer, further comprising the steps of:

sending back, to the source of packets, an indication of having to decrease the rate at which data packets are sent when the filling of said queue exceeds said upper threshold; and sending back, to the source of packets, an indication of having to increase the rate at which data packets are sent when the filling of said queue goes below said lower threshold.

5. A data communications network operated under a TC/IP suite of protocols comprising a TCP protocol layer and an IP protocol layer, wherein said each open TCP connection has an optimal receiving rate, said data communications network comprising, for said each open TCP connection:

means for receiving said data packets from said IP protocol layer;

means for temporarily storing said data packets in a queue dedicated to each said open TCP connection, wherein the queue is in an adaptive streaming (AS) protocol layer inserted between the IP protocol layer and the TCP protocol layers of said TCP/IP suite of protocols;

means for reordering said data packets in the queue; and means for delivering from said AS protocol layer, to said TCP protocol layer, said data packets at said optimal receiving rate of said TCP connection.

6. The data communications network according to claim 5 wherein said optimal receiving rate is a predefined known rate for said open TCP connection.

7. The data communications network according to claim 5 wherein said optimal receiving rate is deduced from an observation of filling of said queue, further comprising:

means for increasing the delivery rate from said AS protocol layer, to said TCP protocol layer, when the filling of said queue goes below an upper threshold; and means for decreasing said delivery rate from said AS protocol layer, to said TCP protocol layer, when the filling of said queue goes above a lower threshold.

8. The data communications network according to claim 5 wherein data packets are sent by a source, said optimal receiving rate being adjusted by the source from the observation of the filling of said queue in said AS layer, further, comprising:

means for sending back, to the source of packets, an indication of having to decrease the rate at which data packets are sent when the filling of said queue exceeds said upper threshold; and means for sending back, to the source of packets, an indication of having to increase the rate at which data packets are sent when the filling of said queue goes below said lower threshold.

9. A computer program product for use with a data communications network operated under a TCP/IP suite of protocols, comprising a TCP protocol layer and an IP protocol layer, wherein said each open TCP connection has an optimal receiving rate, said computer program product comprising, for said each open TCP connection:

computer readable code means for receiving said data packets from said IP protocol layer;

computer readable code means for temporarily storing said data packets in a queue dedicated to each said open TCP connection, wherein the queue is in an adaptive streaming (AS) protocol layer inserted between the IP protocol layer and the TCP protocol layers of said TCP/IP suite of protocols;

computer readable code means for reordering said data packets in the queue; and computer readable code means for delivering from said AS protocol layer, to said TCP protocol layer, said data packets at said optimal receiving rate of said TCP connection.

10. The computer program product according to claim 9 wherein said optimal receiving rate is a predefined known rate for said open TCP connection.

11. The computer program product according to claim 9 wherein said optimal receiving rate is deduced from an observation of filling of said queue, further comprising:

computer readable code means for increasing the delivery rate from said AS protocol layer, to said TCP protocol layer, when the filling of said queue goes below an upper threshold; and computer readable code means for decreasing said delivery rate from said AS protocol layer, to said TCP protocol layer, when the filling of said queue goes above a lower threshold.

12. The computer program product according to claim 9 wherein data packets are sent by a source, said optimal receiving rate being adjusted by the source from the observation of the filling of said queue in said AS layer, further comprising:

computer readable code means for sending back, to the source of packets, an indication of having to decrease the rate at which data packets are sent when the filling of said queue exceeds said upper threshold; and computer readable code means for sending back, to the source of packets, an indication of having to increase the rate at which data packets are sent when the filling of said queue goes below said lower threshold.

* * * * *

UNITED STATES PATENT AND TRADEMARK OFFICE
CERTIFICATE OF CORRECTION

PATENT NO. : 6,880,017 B1
DATED : April 12, 2005
INVENTOR(S) : Marce et al.

It is certified that error appears in the above-identified patent and that said Letters Patent is hereby corrected as shown below:

Column 6,
Line 62, after "wherein" delete "said".
Line 63, after "optimal" insert -- data packet --.

Column 7,
Line 5, after "delivering" insert -- the said data packets --.
Lines 5 and 46, after "layer" delete ",".
Lines 6 and 47, after "layer" delete ", said data packets".
Lines 7 and 48, after "said" insert -- open --.
Lines 16 and 57, after "below" delete "an upper" and insert -- a lower --.
Lines 19 and 60, after "above" delete "a lower" and insert -- an upper --.
Line 35, after "optimal" insert -- data packet --.
Line 38, after "receiving" delete "said".
Line 46, after "delivering" insert -- said data packets --.

Column 8,
Line 17, after "wherein" delete "said".
Line 18, after "optimal" insert -- data packet --.
Line 20, after "receiving" delete "said".
Line 30, after "delivering" insert -- said data packets --.
Line 31, after "AS protocol layer" delete ",".
Lines 31-32, after "TCP protocol layer" delete ", said data packets".
Line 32, after "rate of said" insert -- open --.
Line 42, after "below" delete "an upper" and insert -- a lower --.
Line 47, after "above" delete "a lower" and insert -- an upper --.

Signed and Sealed this

Second Day of May, 2006

JON W. DUDAS
*Director of the United States Patent and Trademark Office*